United States Patent Office 3,450,298
Patented June 17, 1969

3,450,298
FAST RELEASING CONNECTION FOR HIGH PRESSURE CONTAINER PARTS
Helmut Strohmeier and Karl-Heinz Schmitz, Essen, Germany, assignors to Rheinstahl Huttenwerke AG, Essen, Germany
Filed June 13, 1968, Ser. No. 736,820
Claims priority, application Germany, June 24, 1967, R 46,328
Int. Cl. B65d 41/04, 45/00, 53/00
U.S. Cl. 220—39                    4 Claims

ABSTRACT OF THE DISCLOSURE

A fast releasable connection for joining a cover to a high pressure container or vessel which includes a clamping nut having a conical saw tooth thread along its internal circumference to engage a corresponding conical thread on the external circumference of said container. The connection also includes a plurality of pressure screens disposed around the clamping nut for exerting pressure against a pressure ring and gasket to seal the container parts.

---

The present invention relates to connections of container parts, and in particular, to fast releasing connections of container parts which are subject to the internal pressure of a container.

Conventional high pressure connections utilize flanges and connecting screws. These known connections however suffer from the disadvantage, particularly if screws are used on large diameter high pressure containers, that rather heavy connecting screws are required which can only be assembled by means of heavy equipment. The employment of heavy equipment on construction sites is often very difficult. Another disadvantage is that these types of connecting screws also press together the gaskets. By pressing the gaskets during the operation of a high pressure container, the pressing or tightening power is diminished. If non-elastic gaskets are employed, the gaskets can only be tightened by fastening the connecting screws even tighter. These types of connecting screws, therefore, must be of rather large measurement.

Also known are container connections in accordance with the "Bredtschneider" system, that includes a cover, having its outside diameter corresponding to the inner diameter of the container and inserted into the container. The cover translates the inside pressure onto the container via a multisectional ring, the outside diameter of which is larger than the inner diameter of the container, and the inner diameter of which is being smaller than the inside diameter of the container. This cover is inserted into a groove extending around the inner circumference of the container. The cover is kept in place by a ring which is mounted on the outside face of the cover by means of a couple of screws. By tightening the screws, a gasket located between the cover and a pressure ring is pretensioned. The pressure ring is located between the gasket and the multisectional ring.

This kind of locking means can only be used as a so-called cover locking means, having the disadvantage that the gasket which is located between the cover and the multisectional ring is exposed to the full internal pressure of the container during its operation. Therefore, the gaskets must have a corresponding dimension to be able to withstand the pressure of the internal pressure of such a high pressure container.

These aforementioned embodiments are rather disadvantageous, because the connecting elements are rather heavy, particularly with containers having large diameters.

The heavy connecting elements in turn are rather hard to manage, because heavy equipment is needed for their assembly. Moreover, the use of heavy equipment to assemble such types of connections at construction sites is, at times, very disadvantageous, if not impossible.

Another method employed for the connection of cylindrical parts, is to weld these connections together. The disadvantages of welding are also very well known, and include for example the danger of a bad welded seam, the change of the material characteristic at the welded seam, and distortion of the container material characteristics. However, in view of the sometimes large container measurements, a welding procedure must be applied, because of the rather limited hauling possibilities, considering weight and measurements of such huge containers. Further conventional connections also include bayonet-locking means, having bayonet threads or bayonet teeth. The disadvantage of such a connection is that the pressure translating face is interrupted at regular intervals, and includes only a face which would be half of the face of the maximum circumference.

Accordingly, the present invention provides a conical saw toothed thread for connecting the container parts. The thread is screwed onto the container parts so that the tightening of the parts is achieved by a means independent from the screw connections. The saw toothed connection provides a positive locking means in view of its particular characteristic, even after one turn of the screws. The saw tooth connection provides for an uninterrupted engaging connection face. It is essential, however, that the threads are positively screwed together, that is, the threads have to engage positively, and not by special engaging faces of the parts to be connected. Since the sealing of the connection is being accomplished independent of the pressure force of the parts to be connected, it is possible to achieve a positive locking of the connecting parts which can easily be executed at a given construction site.

The inventive connection (locking means) is provided with a gasket between the container and the cover which is tightened by means of a pressure ring and pressure screws. A further advantage of the invention consists of the fact that the parting line of the container parts is being sealed by means of a membrane welded gasket, which is preferably located in the container. Two embodiments of the subject invention are shown in the accompanying drawing, and are described in detail in the following specification.

It is therefore an object of this invention to provide a container connection which eliminates any heavy equipment heretofore necessary for assembling such heavy pressure container connections, and also eliminates welding procedures while providing an adequate pressure face.

It is another object according to the present invention to provide a container connection which is simple in design, easy to manufacture, and which provides a long operating life.

Other objects and features of the present invention will become apparent from the following detailed description considered in connection with the accompanying drawings which disclose two embodiments of the present invention. It should be understood, however, that the drawings are designed for the purpose of illustration only, and not as a definition of the limits of the invention as to which reference should be made in the appended claims.

In the drawings wherein similar reference characters denote similar elements throughout the several views.

Figure 1:
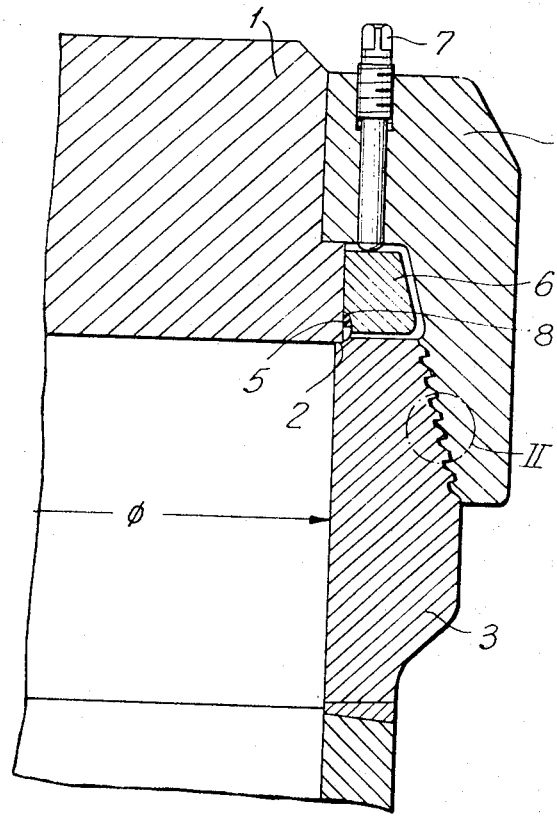
FIG. 1 is a longitudinal cross-sectional view of a fast releasable cover locking means for a high pressure container.

Referring to FIG. 1, a cover 1 is located on container groove 2 on the end rim of container 3, and is maintained by a clamping nut 4 on a conical saw toothed thread. The conical thread is constructed so as to provide a positive locking means between parts 1, 3 and 4, after making just one turn of clamping nut 4 against container 3. For sealing the container, a sealing and a pressure ring 6 is mounted on the largest outside diameter of cover 1, before tightening clamping nut 4. Disposed on the circumference of clamping nut 4 and threadably engaged thereto are evenly distributed pressure screws 7 which press against pressure ring 6. The conical face 8 on ring 6 also presses a gasket 5 against cover 1 and container 3. The pressure force of the seal can be individually adjusted, independent of the longitudinal force to be transmitted.

Figure 2:
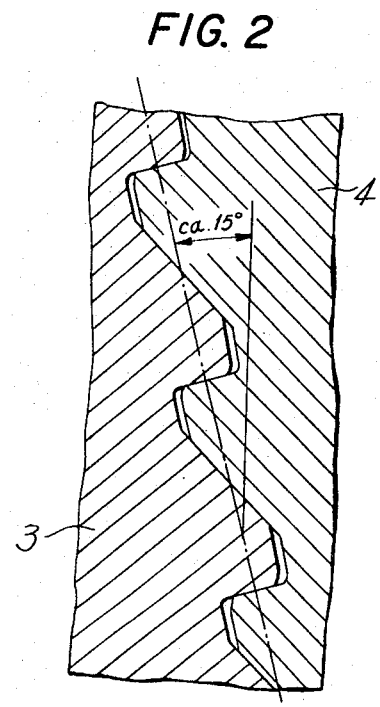
FIG. 2 shows an enlarged longitudinal sectional view of the saw tooth thread of section II in FIGS. 1 and 3.
Figure 3:
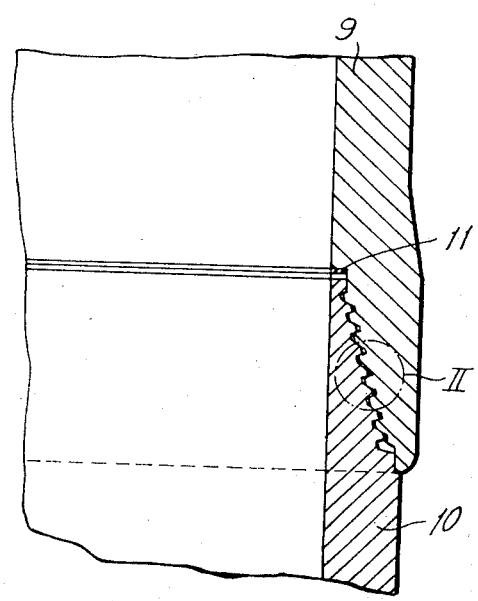
FIG. 3 is a longitudinal cross-sectional view of a connection of two parts of a container.

FIG. 3 shows how the two parts 9 and 10 are connected with each other by means of the conical saw tooth thread illustrated in the enlarged view of FIG. 2. The sealing between parts 9 and 10 is performed by means of a conventional welded membrane gasket 11. The advantage of such a connection consists in the fact that no expensive welding operations have to be performed at the construction site.

The use of the invention, particularly when applied to high pressure containers having large internal diameters such as 2000 mm., and greater results in the advantages of inexpensive material costs, reliable and fast connection of high pressure container parts, transmission of large pressures at relatively small measurements, simplified assembly, and the elimination of testing welded seams at the construction site.

What is claimed is:

1. A fast releasable connection for joining a cover member to the opening of a container comprising;
   a clamping member,
   a conical saw tooth thread disposed along the internal circumference of said clamping member,
   a corresponding conical thread disposed along the external circumference of said container adjacent to its opening for engagement with said clamping thread, and
   sealing means disposed between said cover member and said container for sealing said container parts independent of said thread connection.

2. The connection as recited in claim 1 wherein said sealing means comprises;
   a pressure ring disposed around the circumference of said cover member and having a conical face opening adjacent to cover member and the end of said container,
   a gasket inserted in said conical opening, and means of exerting pressure against said gasket to seal said container parts.

3. The connection as recited in claim 2 wherein said exerting means comprises a plurality of pressure screws disposed at intervals along the circumference of said clamping member and threadably engaged thereto, said screws having one end engaged to said pressure ring to permit said screws to be tightened against said pressure ring so that said gasket will seal said container parts.

4. The connection as recited in claim 1 wherein said sealing means comprises a welded membrane gasket disposed within said container.

References Cited

UNITED STATES PATENTS 3,125,240    3/1964    Gerard et al. _____ 220—55
3,379,332    4/1968    Anderson _____ 220—46

GEORGE T. HALL, *Primary Examiner.*

U.S. Cl. X.R.

220—46, 55